Dec. 16, 1969    A. GERSON    3,484,166
PHOTO-OFFSET PLATE MAKING MACHINE
Filed March 25, 1966    3 Sheets-Sheet 2

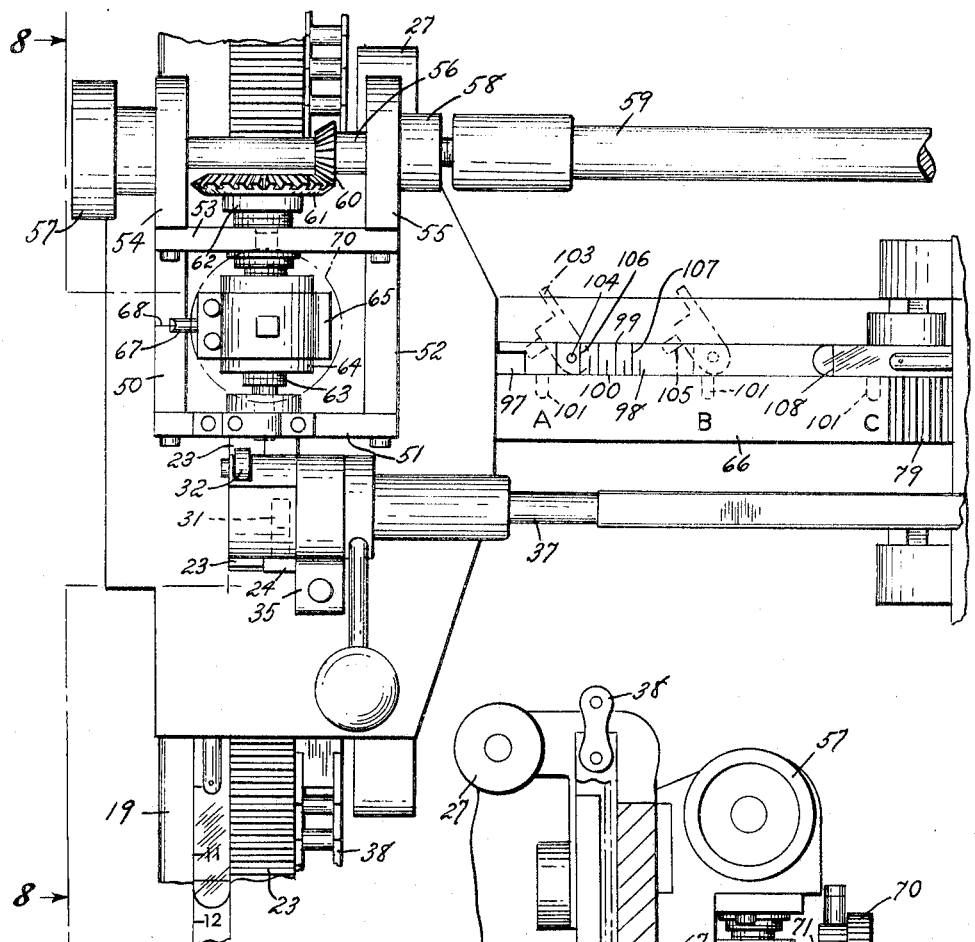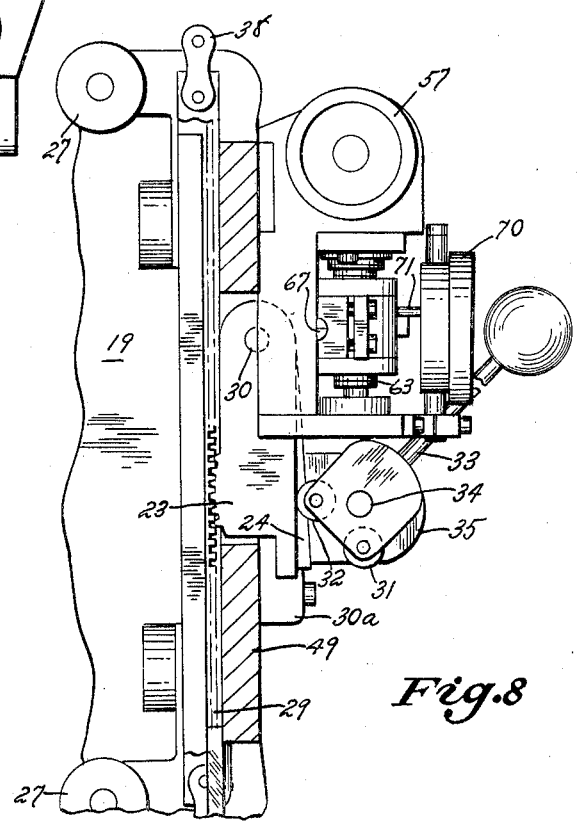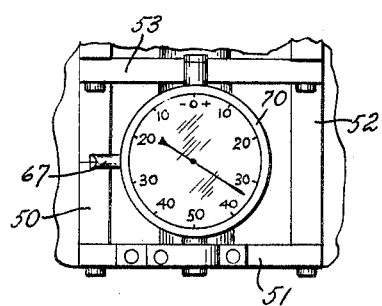

United States Patent Office 3,484,166
Patented Dec. 16, 1969

3,484,166
PHOTO-OFFSET PLATE MAKING MACHINE
Albert Gerson, Baldwin Road,
Yorktown Heights, N.Y. 10598
Filed Mar. 25, 1966, Ser. No. 537,464
Int. Cl. G03b 27/04
U.S. Cl. 355—95                                               4 Claims

ABSTRACT OF THE DISCLOSURE

A photo-offset plate making machine including a rack tooth adjustment mechanism for adjusting the position of a plate holder to an accuracy of one half the width of an individual tooth on the rack adjustment device, and separate cam elements for adjusting the position of the plate holder through distances of less than one half the width of a rack tooth. The rack tooth mechanism includes a pair of rack sections which are mounted on the negative carrier support and a lever for selectively moving the rack sections into engagement with the rack. The negative carrier support has an indexing member with a scale thereon for selectively positioning the negative carrier support relative to the plate support and a locking device for holding the indexing member at any one of a plurality of predetermined positions depending upon the size of the copy being exposed.

---

This invention relates generally to the plate-making art used in photo-offset lithography printing and more particularly to a machine particularly adapted for multi-plate printing and color work. Reference is made to my prior patent, No. 3,150,582, granted Sept. 24, 1964, the present invention relating to improvements in structure disclosed therein.

In the photolithographic process, it is frequently desirable to have multiple images in spaced and predetermined positions on the photographic plate, which images are obtained by repetitive exposure. Certain economies result from the production of a number of identical reproductions from a single plate impression, and in color work the number of impressions is equal to the number of colors used. In order to reproduce work of highly acceptable quality, it is necessary that the various color impressions be exactly superimposed. To this end it is necessary that the negative used to expose the lithographic plate be in precise register and proper contact. While devices of this general character are known, because of the extremely accurate machine work required in the fabrication thereof, and the large bulk and weight involved, such devices are relatively costly, and the use thereof is consequently restricted. In addition, the systems employed in prior art machines are complicated and require considerable training before the operator is capable of reproducing satisfactory work.

In my prior above mentioned patent number 3,150,582 there is disclosed a device including a generally vertically oriented frame which supports a negative carrier in such manner that it may be moved in a parallel vertical plane over the face of a support for the lithographic film, and be locked in proper position in any one of a plurality of positions whereby successive exposures may be made. By virtue of cooperating racks arranged along vertical and horizontal axes, it is possible to obtain fine adjustment of the order of one half of a single rack tooth in either of the two above mentioned directions before the negative carrier is locked in position just prior to an exposure. While this adjustment is simple to use, and has found considerable acceptance in the lithographing trade, it is sometimes desirable to have even finer adjustment of the order of several thousandths of an inch, which the toothed rack engagement cannot always provide.

It is therefore among the principal objects of the present invention to provide improved fine adjustment means which may be employed in a manner to supplement coarser adjustments of the toothed rack type, whereby the best features of both types of adjustment may be simultaneously utilized.

Another object of the invention lies in the incorporation of improved negative cooling means for use during exposure of the negative in juxtaposition to a sheet of photolithographic film, so that with successive exposures under the action of relatively hot illumination lamp means, the temperature of the negative film being printed is maintained within satisfactory limits.

Yet another object of the invention lies in the provision of improved fine adjustment means of the class described which may be readily incorporated into existing prior art devices without extensive modification, and at correspondingly low cost.

A further object of the invention lies in the provision of improved negative cooling means as above described, which may be also incorporated into existing prior art devices with relatively small modification and cost.

These objects and features, as well as other incidental ends and advantages, will more fully appear in the progress of the following disclosure, and be pointed out in the appended claims.

In the drawings, to which reference will be made in the specification, similar reference characters have been employed to designate corresponding parts through out the several views.

FIGURE 6 is a fragmentary view in elevation showing a corresponding vertical axis adjustment means, with certain of the parts removed for purposes of clarity.

FIGURE 7 is a fragmentary view in elevation showing the structure removed from FIGURE 6.

FIGURE 8 is a fragmentary side elevational view as seen from the lefthand portion of FIGURE 6.

Figures 1, 2:
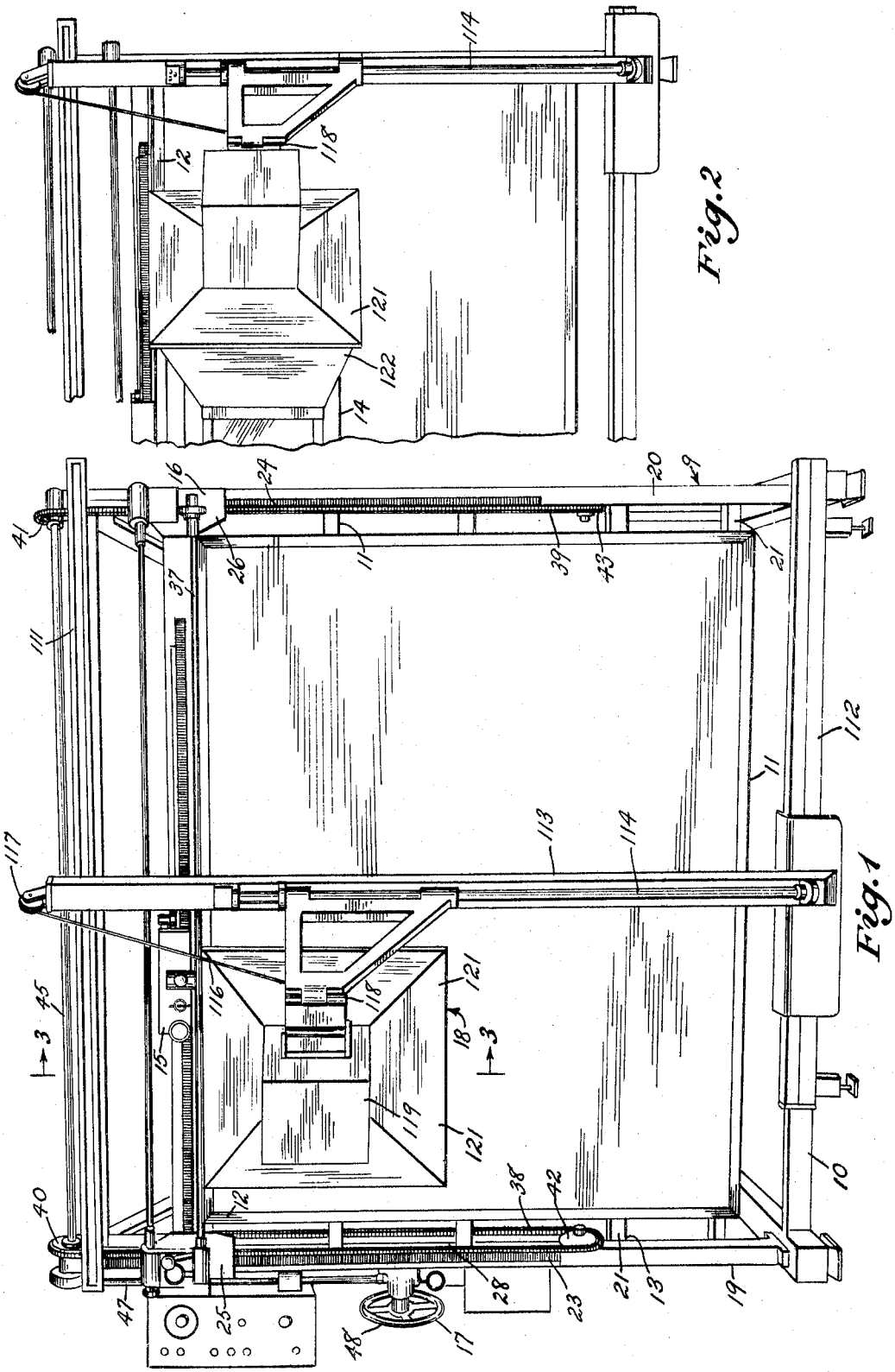
FIGURE 1 is a front perspective view of an embodiment of the invention.
FIGURE 2 is a fragmentary view in perspective, corresponding to that seen in FIGURE 1, and showing certain of the component parts in altered relative position.

In accordance with the invention, the device, generally indicated by reference character 9 comprises broadly: a base 10, a lithographic plate support element 11, lithographic plate registering means 12, mounting means 13 for positioning the support element 11, a negative carrier support 14, horizontal registering means 15, vertical registering means 16, and means 17 to vertically move the horizontal registering means. Supported from the frame 9 is a negative carrier illumination means 18.

The base 9 is preferably possessed of sufficient weight and rigidity to form a stable foundation for the device. Projecting perpendicularly upwardly from the base are a pair of uprights 19 and 20. Secured between the uprights 19 and 20 are a plurality of struts 21 forming the mounting means 13.

The vertical registering means 16 includes a pair of racks 23 and 24 which are substantially identical and are in horizontal alignment. Slidably disposed on said racks are a pair of housings 25 and 26, and, as shown in FIGURE 8, they may have rollers 27 which ride within corresponding channels 28 (see FIGURE 1). Overlying the racks 23 and 24 are short rack sections 29 which are completely complementary to the racks, so that with relatively light pressure the rack sections will properly and alignedly seat or mesh with the racks to immobilize the housings with respect thereto. The rack sections 29 are moved toward and away from the racks 23 and 24 by structure shown in FIGURE 8, and since the housings 25 and 26 are symmetrically identical, a detailed description of one will suffice for the other.

The rack sections 29 are pivotally mounted on a pin 30 trunnioned in the block 30a, and are normally urged to disengaged position by coil springs (not shown), there being one spring for each of the rack sections. Each of the rack sections 29 acts as a follow for its respective cam roller 31 or 32 which are interconnected, and provided with a vertical shift lever 33 keyed to a horizontal shaft 34 journalled in bearings 35. The bearings 35 are secured, one each, to the housings 25 and 26. When the lever 33 is in its upward position as shown in FIGURE 8, one of the rack sections 29 is engaged with a rack 23–24, and when the lever 33 is in its downward position, as shown in FIGURE 6, the other rack section 29 is engaged with a rack 23–24. As the two adjacent rack sections are offset by a fine interval, approximately one half tooth pitch, depending upon whether the lever 33 is moved upwardly or downwardly, and the fineness of the tooth pitch, adjustments in the order of 1/16 inch may be obtained in the above described manner.

Thus, the means 16 serves to provide a relatively coarse adjustment in vertical displacement of the negative carrier support 14 through vertical movement of the housings 25 and 26 as joined by the transverse member 37. The housings 25 and 26 are connected to one point on annular chains 38 and 39 which ride on upper sprockets 40 and 41 and lower sprockets 42 and 43. A counterweight (not shown) is mounted on the chains 38–39 to substantially offset the weight of the means 16. The upper sprockets 40 and 41 are fixed on a transverse upper shaft 45 journalled on the ends of the uprights 19 and 20, respectively. One end of the shaft 45 is connected by a pair of bevel gears (not shown) to a vertical shaft 47 and hand-wheel 48. Thus, when the shift lever 33 is in its neutral position, wherein both rack sections 29 are disengaged, rotation of the hand-wheel moves the transverse member and housings up or down to a desired approximate position (as for example to a position within 1/8 inch of the ultimately desired position). Moving the shift lever up or down will then force one or the other of the rack sections into the racks, and when the parts are fully interengaged they will be disposed precisely at a predetermined position within the steps which are equal to half the pitch of the racks.

To obtain still closer adjustment, in the order of the nearest one thousandth of an inch, the housings 25 and 26 include auxiliary frame elements 49 arranged for rectilinear movement with respect thereto. Each auxiliary frame element includes a plurality of frame members 50, 51, 52 and 53 (see FIGURE 6), the same supporting a pair of trunnions 54 and 55 which in turn mount a stub shaft 56. The shaft 56 mounts a small hand-wheel or knob 57 at one end, and a threaded collar 58 at an opposite end which engages a transverse shaft 59 to transmit motion to a corresponding shaft (not shown) on the oppositely disposed housing. The stub shaft 56 mounts a bevel gear 60 which transmits motion to a bevel gear 61 on a vertically arranged internally threaded bushing 62. A threaded shaft 63 engages the bushing 62 and is provided with a nut member 64 mounted within a supporting bracket 65. The bracket 65 supports a transverse member 66 to be described in greater detail hereinafter. It also supports an index member 67 alignable with an index mark 68 on the frame member 50 when the nut member 64 is in a medial location. The bracket 65 also mounts a dial-type micrometer gauge 70, the operating mechanism of which cooperates with a stud 71 on the frame member 53. From a consideration of FIGURES 6, 7 and 8, it will be apparent that when the housings 25 and 26 are in locked relation with respect to the racks 23 and 24, rotation of the knob 57 results in rotation of the bushing 62, and the raising or lowering of the nut member 64 and bracket 65. This movement is transmitted through the transverse shaft 59 to result in cooresponding movement at the other side of the transverse beam 66, so that the beam 66 moves upwardly or downwardly in a horizontal plane the requisite degree of adjustment. This adjustment will normally be less than the degree of adjustment obtainable by engagement of the rack sections with the racks, and as indicated in FIGURE 7 may be as much as .050 inch in either direction. Because of the extremely high mechanical advantage involved, no locking means is normally required for the above described adjustment.

Figure 4:
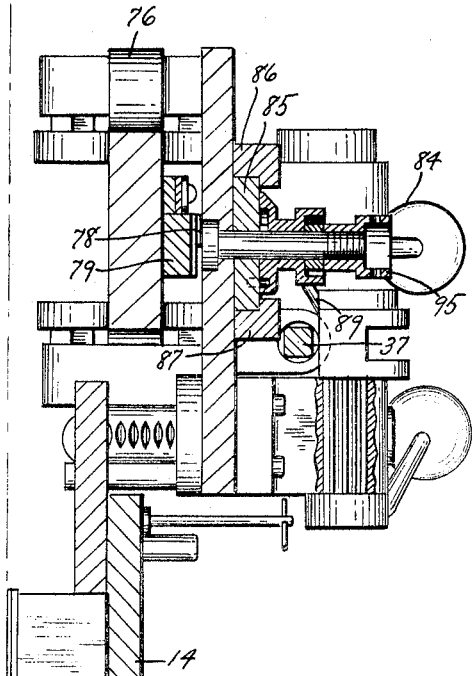
FIGURE 4 is a vertical fragmentary sectional view as seen from the plane 4—4 in FIGURE 5.
Figure 5:
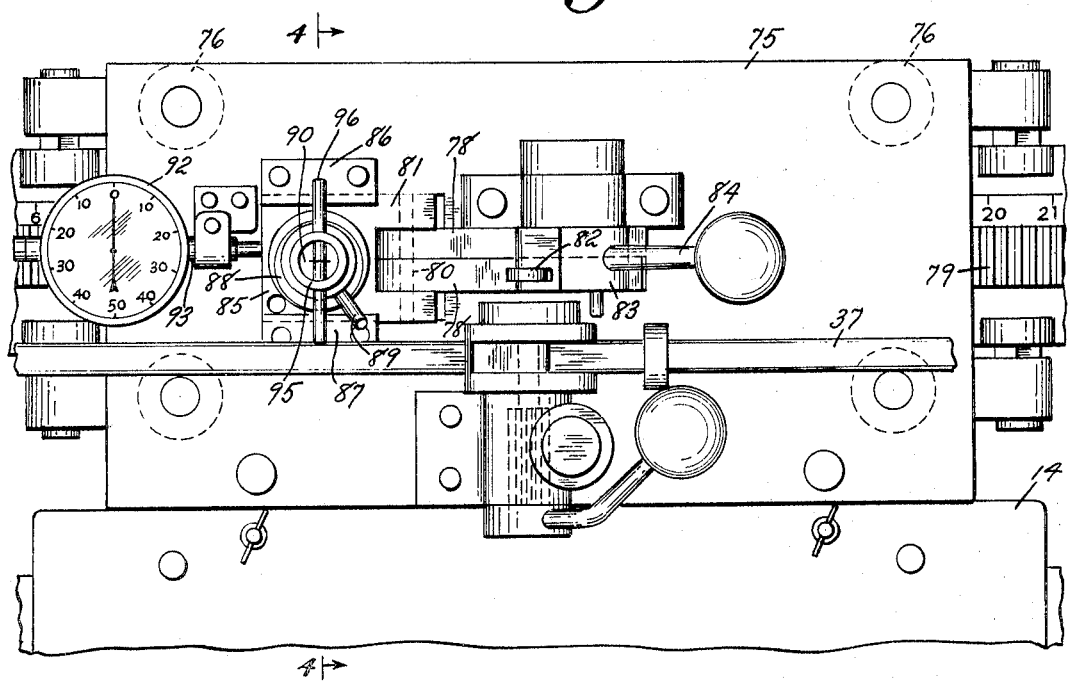
FIGURE 5 is a fragmentary enlarged front elevational view of a chase support incorporating a horizontal axis adjustment means.

The horizontal registering means 15 includes a rectangularly shaped member 75 (see FIGURES 4 and 5) supported on the transverse beam 66 by rollers 76. Corresponding to similar structure in the vertical registering means 16, there are provided rack sections 78 each of which selectively engages the rack 79 on the transverse beam 66. The rack sections 78 are mounted on a pin 80 which provides a pivotal axis in a member 81 which remains fixed with respect to the rack 79 when either rack section is engaged therewith. A pair of corresponding cam rollers, one of which is indicated by reference character 82 are both mounted on a pivotally mounted cam member 83 operated by a shift lever 84. A horizontally adjustable plate 85 is supported in position between upper and lower guides 86 and 87 respectively, the plate being formed integrally with the member 81, and mounting an eccentric cam 88 on a shaft 90. The cam includes a manually engageable member 89 for rotation thereof, the eccentric cam surface bearing against the surface of a circular bore in a follower plate integral with the member 75. Thus, with rotation of the cam 88, minute adjustment of the member 75 along the transverse beam 66 is possible. A micrometer gauge 92 is connected to an operating pintle 93, and is fixed with respect to the member 81, so as to indicate movement of the member 75. A lock-nut 95 bears down upon the shaft 90, and prevents rotation in those applications where minute horizontal adjustment is not required. The nut 95 is provided with a manually engageable member 96 extending the rethrough to facilitate loosening and tightening thereof. The negative carrier support 14 is secured to the lower portion of the member 75, and thus moves horizontally therewith. From a consideration of FIGURES 4 and 5, it will be apparent that a simple mode of operation includes the locating of the member 75 first by locking the same using the shift lever 84, and the subsequent rotation of the cam 88 while reading horizontal displacement on the gauge 92 to the precision desired.

Referring again to FIGURE 6 in the drawings, the transverse beam 66 is provided with a horizontally arranged groove or track 97 in which there is slidably disposed an elongated scale member 98. Preferably, the track 97 is of rectangular cross-section, including an upper wall 99 and a lower wall 100 provided with a plurality of small vertically or laterally arranged bores 101 spaced from each other in equal increments, as for example one inch intervals. The leftward end of the scale member 98 is provided with a pivotal locking member 103 mounted on a pintle 104, and having a projection 105 selectively engageable in one of the bores 101. Rightwardly of the pintle 104 is an index (a point of zero measurement) 106, and subsequent graduations 107. Extending leftwardly from the member 75 is a corresponding index member 108 alignable with the graduations 107.

While the scale member 98 will normally be positioned with the pintle 104 engaged in the leftwardmost bore 101, in certain types of copy, it may be desirable to arrange the leftward margin inwardly from the normal leftward edge of the plate support element 11. When such is the case, the locking member 103 is manually pivoted out of engagement with the leftwardmost bore 101, and the scale member 98 slid rightwardly to the desired location, following which the locking member 103 is again engaged within another bore 101. With a new reference point established, the member 75 may be moved with relation thereto without the necessity of making mental additions to each measurement made on the scale member 98.

Figure 3:
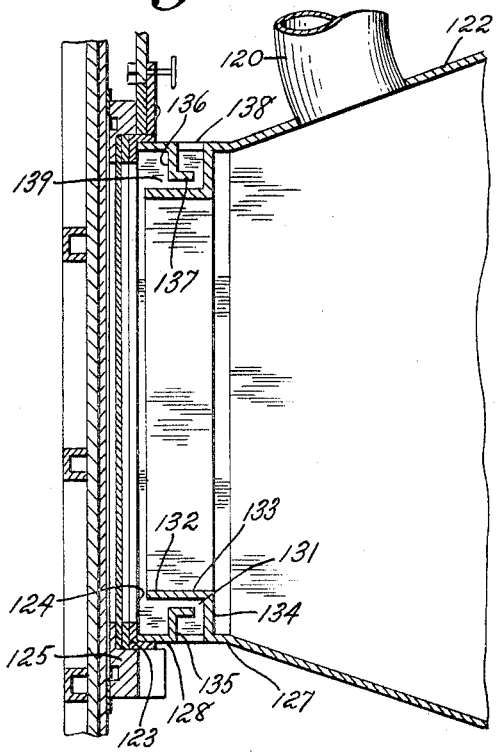
FIGURE 3 is a fragmentary enlarged vertical sectional view as seen from the plane 3—3 in FIGURE 1.

Referring to FIGURES 1, 2 and 3, the negative carrier illumination means 18 is mounted on upper and lower horizontal guides 111 and 112, respectively, the guides in turn supporting a vertical stanchion 113. Extending forwardly for the stanchion 13 and mounted at its upper and lower ends thereto is a vertical supporting shaft 114 mounting a sliding bracket 115. A cable 116 interconnects the upper portion of the bracket 115 and passes over a pulley 117 to a counterweighting means (not shown) disposed within the stanchion 113. A hinge connection 118 supports a lamp-housing 119 in which there is disposed a suitable xenon-type illuminating tube, as well as suitable cooling means 120. The housing 119 includes a flared hood 121 in which the xenon tube is disposed, and a tapered hood 122, the rectangular free edge 123 of which corresponds in dimension to a recess 124 in the negative carrier 125.

At the narrow end 127 of the tapered hood 122 is a peripheral wall 128 which defines the edge 123. Positioned within the wall 128 is an air inlet means 131 which provides a cooling flow of air across the face of the negative support 125 without permitting the leakage of light from the xenon tube from the lamp-housing 119. The means 131 includes a first wall member 132 having first and second mutually angularly disposed wall portions 133 and 134 as well as a second wall member 135 having mutually angularly disposed wall portions 136 and 137. The wall members 132 and 135 thus define a continuous passage for the flow of air, including an inlet portion 138 and an outlet portion 139 positioned adjacent the peripheral edges of the glass frame 140 normally in direct contact with a negative disposed therebeneath. Thus, air entering the lamp-housing 119 in flowing to the cooling means 120 will form a curtain of cool air between the lamp tube and the negative which will permit constant heat removal by convection so that repeated exposures of the same negative at different portions of the area of the photolithographic plate will still maintain the temperature of the negative at an acceptably low level.

I wish it to be understood that I do not consider the invention limited to the precise details of structure shown and set forth in this specification, for obvious modifications will occur to those skilled in the art to which the invention pertains.

I claim:

1. In a photolithographic plate exposing machine including a lithographic plate support, a negative carrier support movable in a plane substantially spaced and parallel to said plate support, improved means for adjusting the position of said carrier support with respect to said plate support comprising: a rack connected to said plate support, a plurality of rack sections mounted on said negative carrier support, one of said rack sections being displaced along the axis of said rack a distance of at least one half the rack pitch, and first means to selectively move said rack sections into engagement with said rack; said negative carrier support including first and second elements interconnected for relative sliding movement along an axis parallel to that of said rack, and second means for adjusting the relative position of said first and second elements in increments of less than one half the rack pitch.

2. Structure in accordance with claim 1 in which said second mentioned means includes an eccentric pivotally mounted cam.

3. Structure in accordance with claim 1 in which said last mentioned means includes a threaded interconnection between said first and second elements.

4. In a photographic plate exposing machine, including a photolithographic plate support, a negative carrier support movable in a plane substantially spaced and parallel with respect to said plate support, and adjustable along a given axis with respect to said plate support, improved means for indexing the location of said negative carrier support relative to said plate support comprising: a supporting member mounted in fixed position relative to said plate support, said supporting member defining a guide means, an elongated calibrated scale having indices, and arranged for rectilinear movement in said guide means, means for locking said scale at any one of a plurality of predetermined positions to locate the indices of said scale at correspondingly spaced locations, and alignable index means on said negative carrier support; said guide means including a channel having laterally extending bores therein, said locking means having a latching projection selectively engageable within said bores.

References Cited

UNITED STATES PATENTS

| 1,832,026 | 11/1931 | Heubner | 95—73 |
| 2,207,449 | 7/1940 | Baker | 95—73 |
| 3,137,224 | 6/1964 | Genson | 95—76 |
| 3,232,202 | 2/1966 | Rice | 95—73 XR |

NORTON ANSHER, Primary Examiner

F. L. BRAUN, Assistant Examiner

U.S. Cl. X.R.

355—99